(12) United States Patent
Jerney

(10) Patent No.: US 10,059,164 B1
(45) Date of Patent: Aug. 28, 2018

(54) EXTENSION ARM AND METHOD OF USE

(71) Applicant: Charles Andrew Jerney, Alpine, CA (US)

(72) Inventor: Charles Andrew Jerney, Alpine, CA (US)

(*) Notice: Subject to any disclaimer, the term of this patent is extended or adjusted under 35 U.S.C. 154(b) by 0 days.

(21) Appl. No.: 15/472,070

(22) Filed: Mar. 28, 2017

(51) Int. Cl.
*B60H 1/00* (2006.01)
*B60H 1/26* (2006.01)

(52) U.S. Cl.
CPC ......... *B60H 1/00364* (2013.01); *B60H 1/262* (2013.01)

(58) Field of Classification Search
CPC .............................. B60H 1/00364; B60H 1/262
USPC ..... 454/129–135, 2, 81, 152, 155, 262, 299, 454/314, 316, 335; 294/209–210
See application file for complete search history.

(56) References Cited

U.S. PATENT DOCUMENTS

| | | |
|---|---|---|
| 342,824 A | 6/1886 | Clark |
| 2,299,838 A | 10/1942 | Mays |
| 4,419,556 A | 12/1983 | Hare |
| 4,984,489 A * | 1/1991 | Krauthamer ............ B25B 13/48 81/121.1 |
| D370,606 S | 6/1996 | Cole et al. |
| 6,045,288 A | 4/2000 | Pasternak et al. |
| 6,457,208 B1 * | 10/2002 | Keith ..................... E05B 1/0053 16/422 |
| 6,860,178 B2 | 3/2005 | Wang |
| 6,901,825 B1 | 6/2005 | Lebron |
| 7,082,644 B2 | 8/2006 | Senner |
| 7,118,091 B2 | 10/2006 | Price |
| 7,131,352 B1 | 11/2006 | Saunders |
| 7,731,574 B2 * | 6/2010 | Milks ..................... B60J 7/1642 296/216.02 |
| D673,019 S * | 12/2012 | Pyle ............................ D13/173 |
| 8,746,656 B2 * | 6/2014 | Huang ................. F16K 31/607 251/292 |
| 2009/0266203 A1 | 10/2009 | Orr et al. |

* cited by examiner

*Primary Examiner* — Vivek Shirsat
(74) *Attorney, Agent, or Firm* — Procopio Cory Hargreaves and Savitch LLP

(57) ABSTRACT

A method of operating at least one of a fan and a vent in a ceiling of a recreational vehicle using an extension arm, the extension arm including an elongated shaft with an operable end, comprising grabbing the extension arm with one's hand; engaging one of a turn switch, a turn crank, and a knob of one of the fan and vent in the ceiling of the recreational vehicle with the operable end; and at least one of operating the fan and vent by rotating one of the turn switch, the turn crank, and the knob with the operable end by rotating the extension arm with one's hand.

11 Claims, 6 Drawing Sheets

EXTENSION ARM AND METHOD OF USE

FIELD OF THE INVENTION

This invention relates generally to extension devices for grabbing or moving an object.

BACKGROUND OF THE INVENTION

Recreation vehicles (RVs) includes vents and fans to provide air ventilation in and through the RV. Many of these vents and fans are operated through turn cranks and switches. Some of these vents and fans (along with the cranks/switches) are located in the ceiling of the RV. To operate the crank/switch, a person of medium or small stature needs to stand on a short ladder or step stool to reach the crank/switch. Older individuals may not possess the balance necessary to stand on a short ladder or step stool. As a result, the older individual could fall from the ladder or stool while reaching for the crank/switch and become injured. Another problem is that the ladder/stool needs to stored in a location where it is readily available. The ladder/stool can occupy significant storage space where little storage space exists.

SUMMARY OF THE INVENTION

An aspect of the invention involves an extension arm that allows one to reach the cranks/switches in RV ceilings top operate the vents/fans.

Another aspect of the invention involves a method of operating at least one of a fan and a vent in a ceiling of a recreational vehicle using an extension arm, the extension arm including an elongated shaft with an operable end, comprising grabbing the extension arm with one's hand; engaging one of a turn switch, a turn crank, and a knob of one of the fan and vent in the ceiling of the recreational vehicle with the operable end; and at least one of operating the fan and vent by rotating one of the turn switch, the turn crank, and the knob with the operable end by rotating the extension arm with one's hand.

One or more implementations of the aspect of the invention described immediately above includes one or more of the following: the operable end includes a coupling attached to the extension arm, the coupling including a plurality of tangs, and engaging includes engaging the turn switch with the plurality of tangs; the turn switch includes a plurality of arms and the coupling of the operable end includes a plurality of spaced notches separating the plurality of tangs, and engaging includes receivably engaging the plurality of arms of the turn switch in the plurality of spaced notches of the coupling of the operable end; the coupling with tangs include an outer surface and a plurality of reinforcement tangs adhered to an outer surface to reinforce the tangs and prevent the tangs from breaking off from the coupling; the coupling with tangs include an outer surface and the operable end includes an outer, larger-diameter coupling with tangs adhered to the outer surface of coupling with tangs to reinforce the tangs and prevent the tangs from breaking off from the coupling; the extension arm includes a circular end with an O-ring thereon, and the method further includes pressing a fan switch with the O-ring to operate a fan in the ceiling of the recreational vehicle; the extension arm includes an end with a cap, and the method further includes pressing a fan switch with the cap to operate a fan in the ceiling of the recreational vehicle; the knob is a vent control knob and includes a plurality of protruding portions and the operable end includes a coupling attached to the extension arm, the coupling including an open-ended vent knob control member having a plurality channels, and engaging includes receivably engaging the plurality of protruding portions of the vent control knob within the plurality of channels of the coupling of the operable end; the turn crank includes a single turn crank arm and the operable end includes a plurality of notches, and engaging includes receivably engaging the single turn crank arm within one of the plurality of notches; the turn crank includes a pair of arms extending linearly in opposite directions from each other and the operable end includes a plurality of notches, and engaging includes receivably engaging the pair of arms within two respective notches of the plurality of notches; the extension arm includes a second operable end including one of a coupling including a plurality of tangs, a coupling including a plurality of tangs and a plurality of spaced notches separating the plurality of tangs, a coupling including a plurality of tangs, an outer surface, and a plurality of reinforcement tangs adhered to an outer surface, a coupling including a plurality of tangs, an outer surface, and an outer, larger-diameter coupling with tangs adhered to the outer surface of coupling with tangs, a circular end with an O-ring thereon, an end cap, a coupling including an open-ended vent knob control member having a plurality channels, a plurality of notches, and the method further comprising grabbing the extension arm with one's hand; engaging one of a turn switch, a pressable switch, a turn crank, and a knob of one of the fan and vent in the ceiling of the recreational vehicle with the second operable end; and at least one of operating the fan and vent by one of rotating one of the turn switch, the turn crank, and the knob with the second operable end by rotating the extension arm with one's hand, and pressing the pressable switch with the second operable end by raising the extension arm with one's hand; and/or the method includes first grabbing the extension arm with one's hand near the second operable end and engaging and operating one of the turn switch, the turn crank, and the knob with the operable end followed by grabbing the extension arm near an opposite end, the operable end, and engaging and operating one of the turn switch, the turn crank, and the knob with the second operable end.

An additional aspect of the invention involves an extension arm for operating at least one of a fan and a vent in a ceiling of a recreational, comprising an elongated shaft with an operable end to engage and rotate one of a turn switch, a turn crank, and a knob of one of the fan and vent in the ceiling of the recreational vehicle.

One or more implementations of the aspect of the invention described immediately above includes one or more of the following: the operable end includes a coupling attached to the extension arm, the coupling including a plurality of tangs to engage the turn switch; the turn switch includes a plurality of arms and the coupling of the operable end includes a plurality of spaced notches separating the plurality of tangs to receivably engage the plurality of arms of the turn switch in the plurality of spaced notches of the coupling of the operable end; the coupling with tangs include an outer surface and a plurality of reinforcement tangs adhered to an outer surface to reinforce the tangs and prevent the tangs from breaking off from the coupling; the coupling with tangs include an outer surface and the operable end includes an outer, larger-diameter coupling with tangs adhered to the outer surface of coupling with tangs to reinforce the tangs and prevent the tangs from breaking off from the coupling; the extension arm includes a circular end with an O-ring thereon to press the fan switch with the O-ring to operate a fan in the ceiling of the recreational vehicle; the extension arm includes an end with a cap to press the fan switch with the cap to operate a fan in the ceiling of the recreational vehicle; the knob is a vent control knob and includes a plurality of protruding portions and the operable end includes a coupling attached to the extension arm, the coupling including an open-ended vent knob control member having a plurality channels to receivably engage the plurality of protruding portions of the vent control knob; the turn crank includes a single turn crank arm and the operable end includes a plurality of notches, one of which receivably engages the single turn crank arm; the turn crank includes a pair of arms extending linearly in opposite directions from each other and the operable end includes a plurality of notches, two of which receivably engage the pair of arms; and/or the extension arm includes a second operable end including one of a coupling including a plurality of tangs, a coupling including a plurality of tangs and a plurality of spaced notches separating the plurality of tangs, a coupling including a plurality of tangs, an outer surface, and a plurality of reinforcement tangs adhered to an outer surface, a coupling including a plurality of tangs, an outer surface, and an outer, larger-diameter coupling with tangs adhered to the outer surface of coupling with tangs, a circular end with an O-ring thereon, an end cap, a coupling including an open-ended vent knob control member having a plurality channels, a plurality of notches.

DETAILED DESCRIPTION OF THE PREFERRED EMBODIMENTS

Figure 1A:
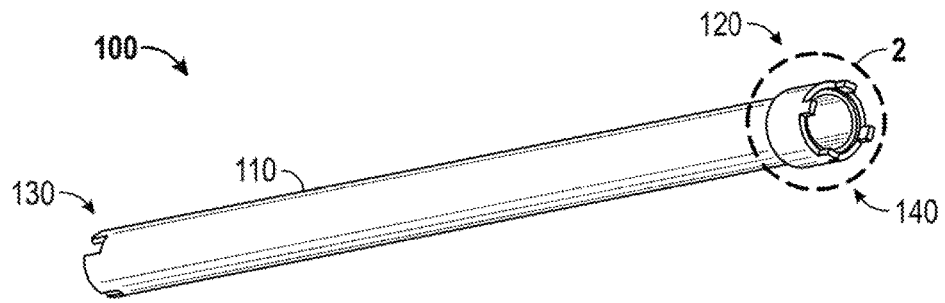
FIG. 1A is a front perspective view of an embodiment of an extension arm.
Figure 1B:
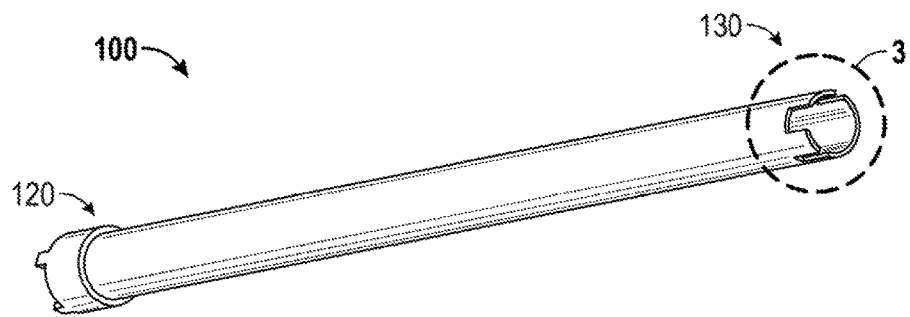
FIG. 1B is a rear perspective view of the extension arm of FIG. 1A.

With reference to FIGS. 1-13, an embodiment of an extension arm or extender 100 that allows people to reach cranks and switches in RV ceilings to operate the vents and fans in the RV ceilings will be described.

The extension arm 100 includes an elongated cylindrical pipe or shaft 110, a first operable end 120, and an opposite second operable end 130. In the embodiment shown, the pipe 110 is 1 in. PVC plastic pipe that is 24 in. in length. In alternative embodiments, the shaft 110 includes one or more of alternative constructions, configurations, materials, lengths, diameters, and/or dimensions.

Figure 2:
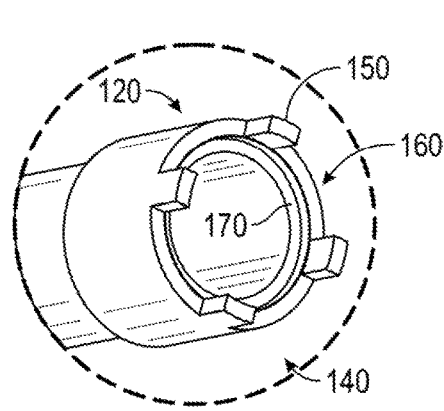
FIG. 2 is a perspective view taken in area 2 of FIG. 1A of a first operable end of the extension arm.

As shown best in FIG. 2, the first operable end 120 includes a cylindrical coupling 140 that is attached (e.g., by adhesive such as glue) at the first operable end 120. In an alternative embodiment, the first operable end 120 does not include the coupling 140. A distal end of the coupling includes four substantially rectangular, tooth-shaped tangs 150 spaced evenly by notches 160. The tangs 150 extend distally from the first operable end 120, parallel with a central longitudinal axis defined by the cylindrical pipe 110. A rubber O-ring 170 is attached to a terminal end of the cylindrical pipe 110 at the first operable end 120, circumferentially interior to the coupling 140. In the embodiment shown, the height of each tang 150 is ⅜ in. and the width of each tang 150 is ⁵⁄₁₆ in. and the straight-line distance between tangs 150 or straight-line width of each notch 160 is ¾ in. In the embodiment shown, the rubber O-ring 170 is 1⅙ in. in diameter, ¹⁵⁄₁₆ in. in with, and ⅛ in. in height. In the embodiment shown, the height of coupling 140 (from the proximal end to the base of the tangs 150) is 1⅛ in.

Figure 9:
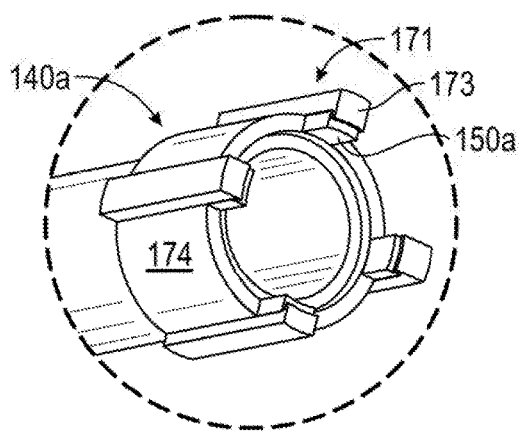
FIG. 9 is a perspective view of another embodiment of an operable end of the extension arm.
Figure 10:
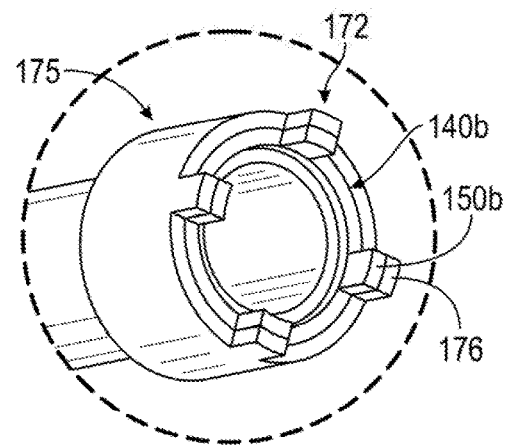
FIG. 10 is a perspective view of an additional embodiment of an operable end of the extension arm.

FIGS. 9 and 10 show further embodiments of operable ends 171, 172 similar to first operable end 120. Like elements will be shown and described with like reference numbers, but with an "a" and "b" suffix. In FIG. 9, the operable end 171 includes reinforcement tangs 173 that are adhered to an outer surface 174 of the coupling 140a and tangs 150a, reinforcing the tangs 150a and prevent them from snapping/breaking off from the coupling 140a. The reinforcement tangs 173 extend the height/length of the operable end 171 (i.e., the combined height of the coupling 140a, including tangs 150a). In FIG. 10, the operable end 172 includes an outer, larger-diameter coupling 175 with tangs 176, which slides over and adheres to the outer surface of inner, smaller-diameter coupling 140b with tangs 150b, reinforcing the tangs 150b and prevent them from snapping/breaking off from the coupling 140b.

Figure 3:
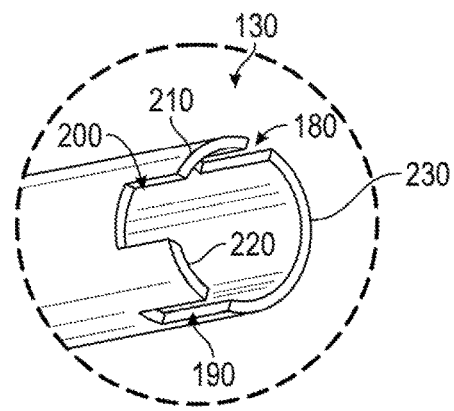
FIG. 3 is a perspective view taken in area 3 of FIG. 1B of a second operable end of the extension arm.

As shown in FIG. 3, the second operable end 130 includes a first notch 180, a second notch 190, and a third notch 200. The first notch 180 and the second notch 190 separates a first tang 210 from a third tang 230 and a second tang 220 from a third tang 230. In the embodiment shown, the first notch 180 and second notch 190 are 180 degrees apart. The height of the first notch 180 and second notch 190 is ⁵⁄₁₆ in. and the height of the third notch 200 is 1.2 in. The width of the first notch 180 and second notch 190 is ⅛ in. and the width of the third notch 200 is 0.5 in.

Figure 4:
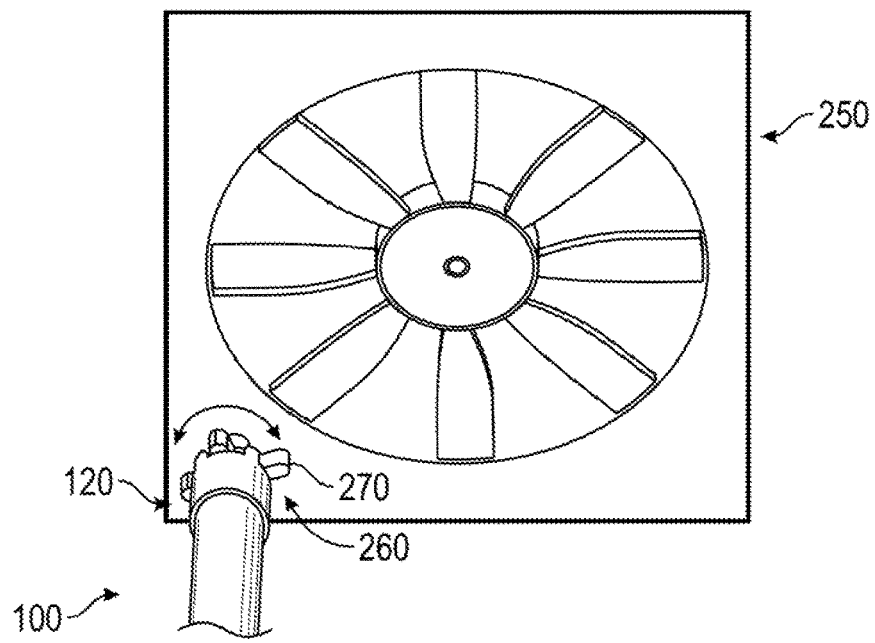
FIG. 4 is a perspective view of the first operable end of the extension arm engaged with a turn switch of a fan in a RV ceiling.
Figure 6:
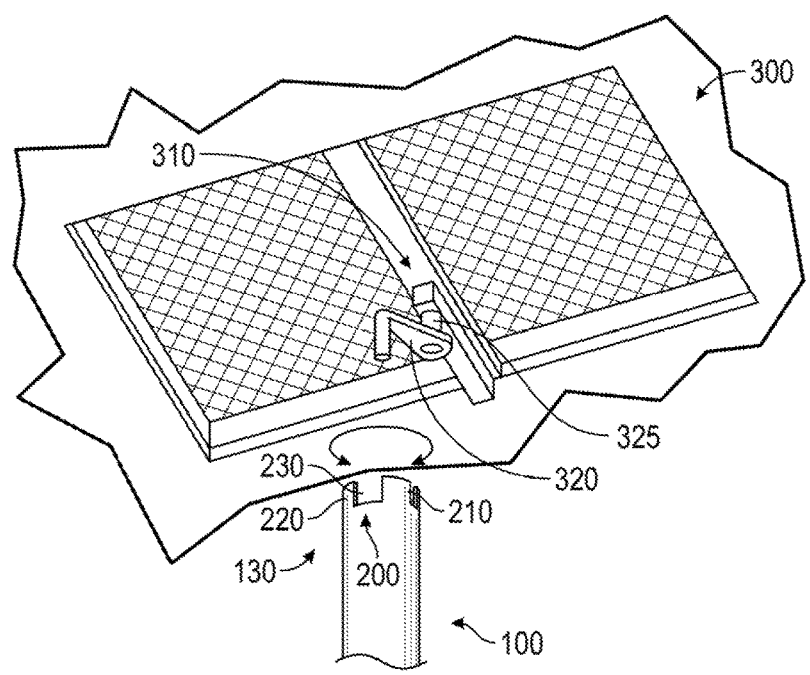
FIG. 6 is a perspective view of the second operable end of the extension arm adjacent to a first type of turn crank of a vent in a RV ceiling.
Figure 7:
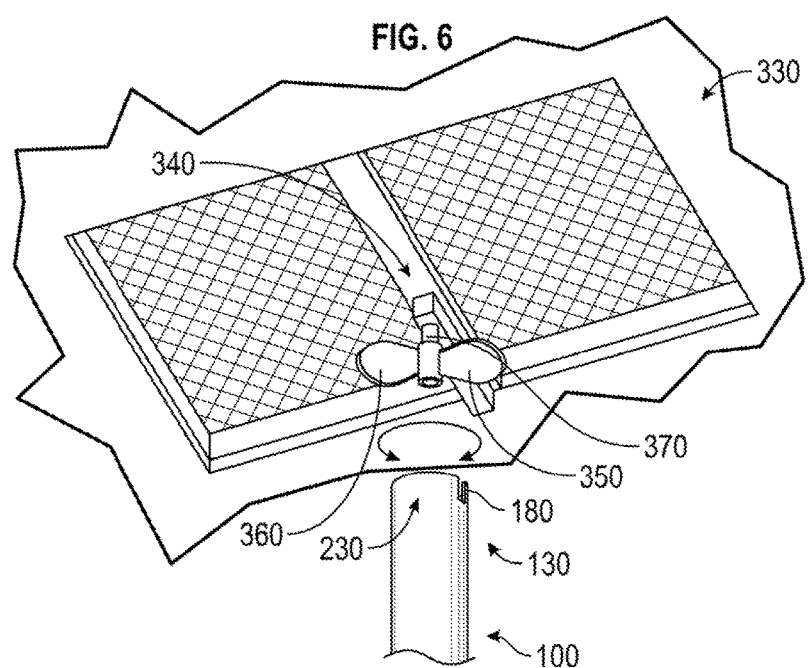
FIG. 7 is a perspective view of the second operable end of the extension arm adjacent to a second type of turn crank of a vent in a RV ceiling.
Figure 8:
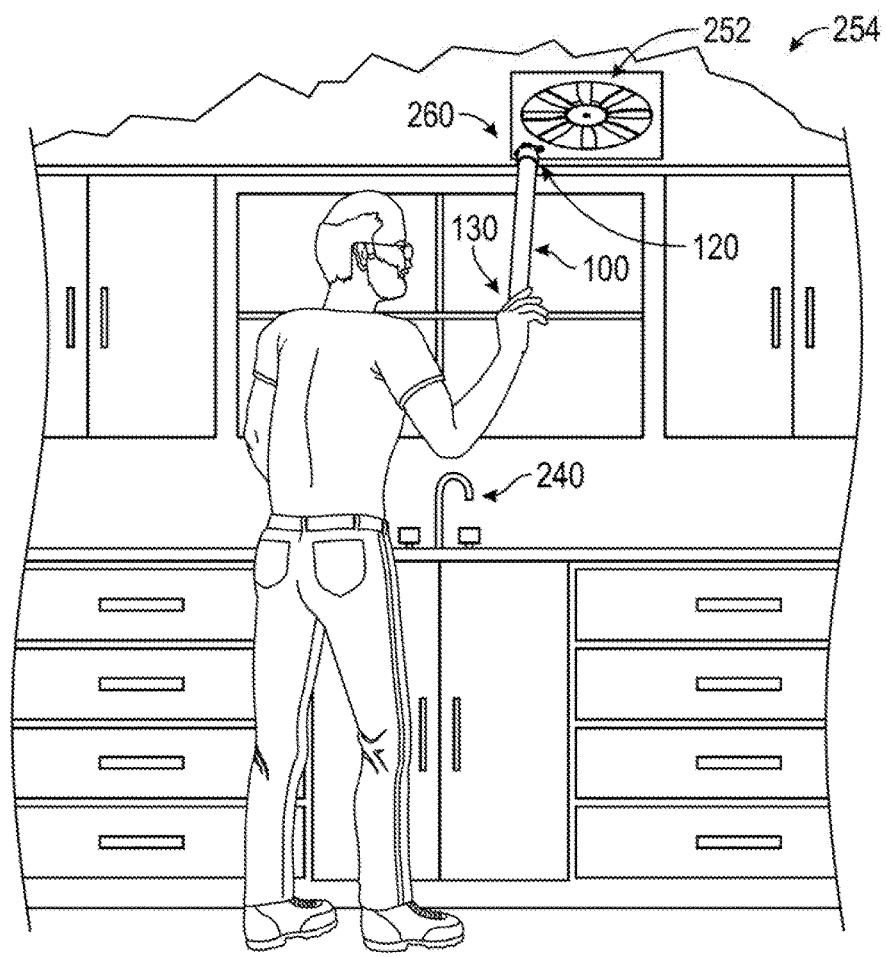
FIG. 8 is a perspective view of user using the extension arm to operate a turn switch of a fan in a RV ceiling without the need for a ladder or step stool.

With reference to FIGS. 4-8, and initially FIGS. 4 and 8, the extension arm 100 will now be described in use. To turn on or off a fan 250 in a ceiling 252 of a RV 254, a user 240 grabs the extension arm 100 near the second operable end 130 and lifts the extension arm 100 upward so as to reach, engage, and operate a fan switch 260 with the first operable end 120. The fan switch 260 is engaged so that the four arms 270 (in a cross-shaped configuration) are receivably engaged respectively by the four evenly spaced notches 160 of the cylindrical coupling 140 at the first operable end 120. To turn on the fan 250, the fan switch 260 is rotated clockwise by the first operable end 120 by rotating the second operable end 130. Because the first operable end 120 is fixed relative to the second operable end 130, rotation of the second operable end 130 causes corresponding rotation in the first operable end 120, causing the fan switch 260 to rotate accordingly. Rotation of the fan switch 260 clockwise turns on the fan 250 and rotation of the fan switch 260 counter clockwise turns off the fan 250.

Figure 5:
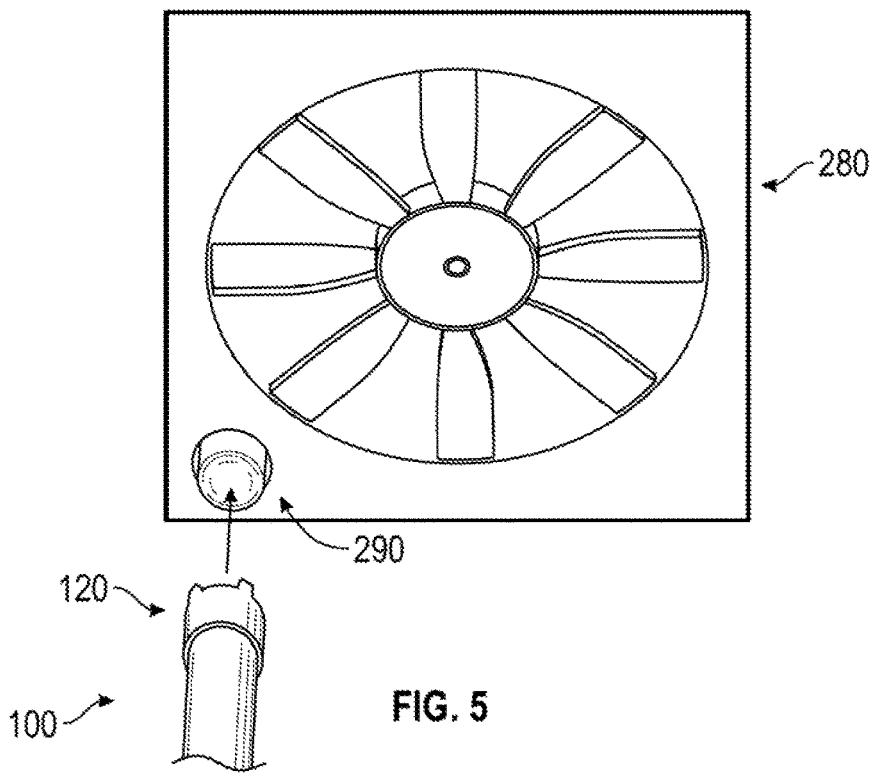
FIG. 5 is a perspective view of the first operable end of the extension arm adjacent to a turn switch of a fan in a RV ceiling.
Figure 11:
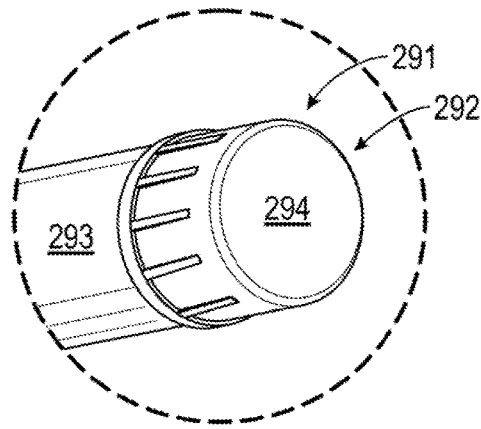
FIG. 11 is a perspective view of a further embodiment of an operable end of the extension arm.

With reference to FIG. 5, to turn on/off a fan 280 including a push-button switch 290 in the RV ceiling, the user 240 handles the extension arm 100 in a similar manner to that discussed above with respect to FIG. 4, except that the first operable end 120 is used to push on and off the push-button switch 290. The coupling 140 of the first operable end 120 is fit over the push-button switch 290 and a front face of the push-button switch 290 is engaged by a distal face of the rubber O-ring 170 to push on and off the push-button switch 290. With reference to FIG. 11, in another embodiment, an operable end 291 includes a cap 292 that slides over and adheres to an outer surface 293 of the extension arm 100. The front face of the push-button switch 290 is engaged by end wall 294 of the cap 292 of the operable end 291 to push on and off the push-button switch 290.

With reference to FIG. 6, to open/close a vent 300 in a ceiling 252 of a RV 254, a user 240 grabs the extension arm 100 near the first operable end 120 and lifts the extension arm 100 upward so as to reach, engage, and operate a turn crank 310 with the second operable end 130. The turn crank 310 is engaged so that single turn crank arm 320 extending from turn crank shaft 325 is receivably engaged by third notch 230 at the second operable end 130. To open the vent 300, the turn crank 310 is rotated clockwise by the second operable end 130 by rotating the first operable end 120. Rotation of the turn crank 310 clockwise opens the vent 300 and rotation of the turn crank 310 counter clockwise closes the vent 300.

With reference to FIG. 7, to open/close a vent 330 in a ceiling 252 of a RV 254, a user 240 grabs the extension arm 100 near the first operable end 120 and lifts the extension arm 100 upward so as to reach, engage, and operate a turn crank 340 with the second operable end 130. The turn crank 340 is engaged so that a pair of arms/wings/blades 350, 360 extending outward linearly in opposite directions from turn crank shaft 370 are receivably engaged respectively by first notch 180 and second notch 190 at the second operable end 130. To open the vent 330, the turn crank 340 is rotated clockwise by the second operable end 130 by rotating the first operable end 120. Rotation of the turn crank 310 clockwise opens the vent 330 and rotation of the turn crank 310 counter clockwise closes the vent 330.

Figure 12:
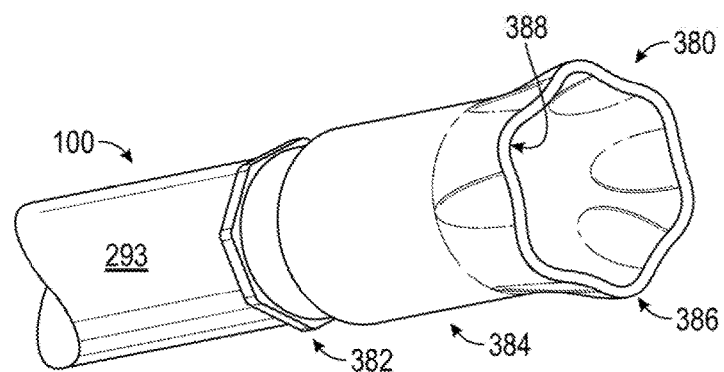
FIG. 12 is a perspective view of a still further embodiment of an operable end of the extension arm.
Figure 13:
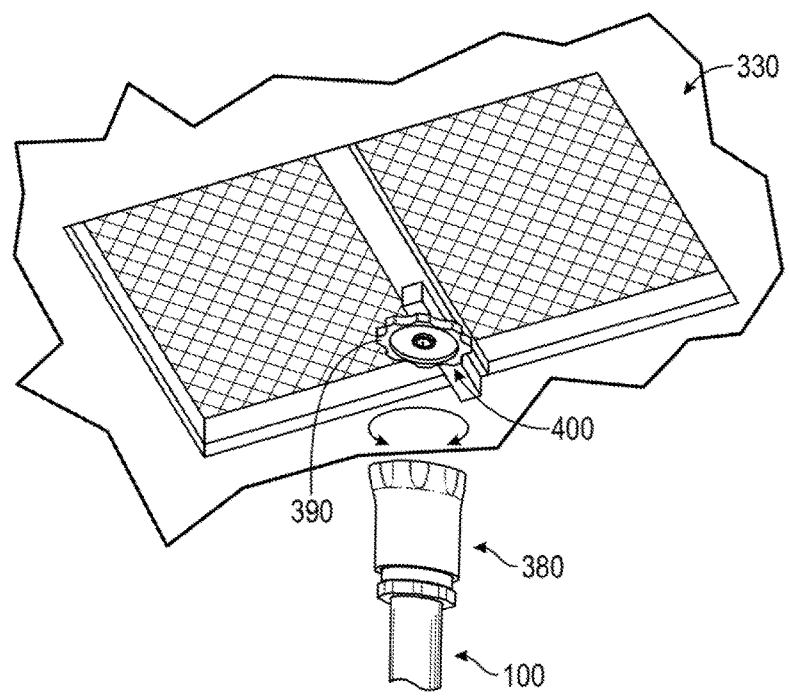
FIG. 13 is a perspective view of the operable end of FIG. 12 adjacent to a third type of turn crank of a vent in a RV ceiling.

With reference to FIGS. 12 and 13, another embodiment of an operable end 380 of the extension arm 100 is used to open/close a vent 330 in a ceiling 252 of a RV 254. The operable end 380 includes a first cylindrical coupling 382 that slides over and may be adhered to an outer surface 293 of the extension arm 100. A second cylindrical coupling 384 slides over and may be adhered to an outer surface of the first cylindrical coupling 382. In an alternative embodiment, the first cylindrical coupling 382 and the second cylindrical coupling 384 may be a single integrated coupling member instead of be two separate coupling members 382, 384. The second cylindrical coupling 384 includes an open-ended window/vent knob control member 386. The window/vent knob control member 386 includes a plurality (e.g., six) of recesses/channels 388 that receive corresponding protruding portions 390 of window/vent knob 400 to engage and turn the window/vent knob 400 clockwise and counter clockwise to open/close the vent 330.

Thus, the extension arm 100 (via the operable ends 120, 130, 171, 172, 291, 380) enables a user 240 to reach and/or operate the turn switches 260, 290, the crank arms 310, 340, and the window/vent knob 400 in the ceilings of RVs 254 to operate the fans 250, 280 and vents 300, 330 in the ceilings of RVs 254. The extension arm 100 and the operable ends 120, 130, 171, 172, 291, 380 eliminate the need for short ladders/step stools to reach and operate the turn switches 260, 290, the crank arms 310, 340, and the window/vent knob 400 in the ceilings of RVs 254. Eliminating the need for short ladders/step stools eliminates the risk of the user falling and hurting oneself and eliminates the extra storage space requirements of short ladders/step stools. In one or more embodiments, one end of the extension arm 100 includes operable ends 120, 130, 171, 172, 291, or 380 and a second, opposite end of the extension arm 100 includes operable ends 120, 130, 171, 172, 291, or 380.

The above figures may depict exemplary configurations for the invention, which is done to aid in understanding the features and functionality that can be included in the invention. The invention is not restricted to the illustrated architectures or configurations, but can be implemented using a variety of alternative architectures and configurations. Additionally, although the invention is described above in terms of various exemplary embodiments and implementations, it should be understood that the various features and functionality described in one or more of the individual embodiments with which they are described, but instead can be applied, alone or in some combination, to one or more of the other embodiments of the invention, whether or not such embodiments are described and whether or not such features are presented as being a part of a described embodiment. Thus the breadth and scope of the present invention, especially in the following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items e present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

I claim:

1. A method of operating at least one of a fan and a vent in a ceiling of a recreational vehicle using an extension arm, the extension arm including an elongated shaft with an operable end, comprising:
   engaging one of a turn switch, a turn crank, and a knob of one of the fan and vent in the ceiling of the recreational vehicle with the operable end;
   at least one of operating the fan and vent by rotating one of the turn switch, the turn crank, and the knob with the operable end by rotating the extension arm,
   wherein the operable end includes a coupling attached to the extension arm, the coupling including an axial center coaxial with an axial center of the extension arm, the coupling including a periphery, at least three tangs on the periphery, and at least three corresponding notches on the periphery and forming openings at the periphery, each of said at least three tangs extending circumferentially around the coupling, and engaging includes engaging one of the turn switch, the turn crank, and the knob with said at least three tangs whereby one of the turn switch, the turn crank, and the knob extends through the openings formed by notches, external to the periphery of the coupling.

2. The method of claim 1, wherein the turn switch includes a plurality of arms and engaging includes receiving the plurality of arms in the at least three notches.

3. The method of claim 1, wherein the turn switch includes four arms, the at least three tangs include four tangs, and the at least three notches include four notches, and engaging includes receivably engaging the four arms of the turn switch in the four spaced notches of the coupling of the operable end.

4. The method of claim 2, wherein the coupling with tangs include an outer surface and a plurality of reinforcement tangs adhered to the outer surface to reinforce the tangs and prevent the tangs from breaking off from the coupling.

5. The method of claim 2, wherein the coupling with tangs include an outer surface and the operable end includes an outer, larger-diameter coupling with tangs adhered to the outer surface of coupling with tangs to reinforce the tangs and prevent the tangs from breaking off from the coupling.

6. The method of claim 1,
   wherein the extension arm includes a circular end with an O-ring thereon, and the method further includes receiving a fan switch in the circular end and pressing the fan switch with the O-ring to operate a fan in the ceiling of the recreational vehicle.

7. The method of claim 1, wherein the extension arm includes an end with a cap, and the method further includes pressing a fan switch with the cap to operate a fan in the ceiling of the recreational vehicle.

8. The method of claim 1, wherein the turn crank includes a single turn crank arm, and engaging includes receivably engaging the single turn crank arm within one of the plurality of notches.

9. The method of claim 1, wherein the turn crank includes a pair of arms extending linearly in opposite directions from each other, and engaging includes receivably engaging the pair of arms within two respective notches of the plurality of notches.

10. A method of operating at least one of a fan and a vent in a ceiling of a recreational vehicle using an extension arm, the extension arm including an elongated shaft with an operable end, comprising:
    engaging one of a turn switch, a turn crank, and a knob of one of the fan and vent in the ceiling of the recreational vehicle with the operable end;
    at least one of operating the fan and vent by rotating one of the turn switch, the turn crank, and the knob with the operable end by rotating the extension arm,
    wherein the extension arm includes a second operable end including one of
       a coupling including a plurality of tangs,
       a coupling including a plurality of tangs and a plurality of spaced notches separating the plurality of tangs,
       a coupling including a plurality of tangs, an outer surface, and a plurality of reinforcement tangs adhered to the outer surface,
       a coupling including a plurality of tangs, an outer surface, and an outer, larger-diameter coupling with tangs adhered to the outer surface of coupling with tangs, a circular end with an O-ring thereon, an end cap, and
       a coupling including an open-ended vent knob control member having a plurality channels, a plurality of notches,
    and the method further comprising
       engaging one of a turn switch, a pressable switch, a turn crank, and a knob of one of the fan and vent in the ceiling of the recreational vehicle with the second operable end; and
    at least one of
       operating the fan and vent by one of rotating one of the turn switch, the turn crank, and the knob with the second operable end by rotating the extension arm, and
       pressing the pressable switch with the second operable end by raising the extension arm.

11. The method of claim 10, wherein the method includes engaging and operating one of the turn switch, the turn crank, and the knob with the operable end followed by engaging and operating one of the turn switch, the turn crank, and the knob with the second operable end.

* * * * *